(12) United States Patent
Hida (10) Patent No.: US 11,176,455 B2
(45) Date of Patent: Nov. 16, 2021

(54) LEARNING DATA GENERATION APPARATUS AND LEARNING DATA GENERATION METHOD

(71) Applicant: FUJITSU LIMITED, Kawasaki (JP)

(72) Inventor: Yusuke Hida, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 228 days.

(21) Appl. No.: 16/694,311

(22) Filed: Nov. 25, 2019

(65) Prior Publication Data
US 2020/0175366 A1  Jun. 4, 2020

(30) Foreign Application Priority Data
Nov. 29, 2018  (JP) .............................. JP2018-223405

(51) Int. Cl.
*G06N 3/08* (2006.01)
*G06N 20/00* (2019.01)
*G06K 9/62* (2006.01)
*G06T 5/00* (2006.01)

(52) U.S. Cl.
CPC ............. *G06N 3/08* (2013.01); *G06K 9/6201* (2013.01); *G06K 9/628* (2013.01); *G06N 20/00* (2019.01); *G06T 5/001* (2013.01); *G06T 2207/20081* (2013.01); *G06T 2207/20084* (2013.01)

(58) Field of Classification Search
CPC .......... G06F 17/30; G06N 3/08; G06N 20/00; G06K 9/6201; G06K 9/628; G06T 5/001; G06T 2207/20081; G06T 2207/20084
See application file for complete search history.

(56) References Cited

U.S. PATENT DOCUMENTS

| | | | | |
|---|---|---|---|---|
| 2019/0114743 A1* | 4/2019 | Lund | ................. | G06N 3/0454 |
| 2019/0286932 A1* | 9/2019 | Du | ................. | G06K 9/4642 |
| 2020/0151692 A1* | 5/2020 | Gao | ................. | G06Q 10/087 |
| 2021/0150249 A1* | 5/2021 | Zheng | ................. | G06K 9/3233 |

FOREIGN PATENT DOCUMENTS

| | | |
|---|---|---|
| JP | 2010-218051 | 9/2010 |
| JP | 2011-008507 | 1/2011 |
| JP | 2014-038566 | 2/2014 |

OTHER PUBLICATIONS

A. Krizhevsky et al.,"ImageNet Classification with Deep Convolutional Neural Networks", NIPS'12 Proceedings of the 25th International Conference on Neural Information Processing Systems, vol. 1, 9 Pages, Dec. 2012.
E. Rublee et al.,"ORB: an efficient alternative to SIFT or SURF", ICCV '11 Proceedings of the 2011 International Conference on Computer Vision, 8 Pages, Nov. 2011.

(Continued)

*Primary Examiner* — Fayyaz Alam
(74) *Attorney, Agent, or Firm* — Fujitsu Patent Center (57) ABSTRACT

A learning data generation apparatus includes a memory and a processor configured to perform determination of a region of interest in each of a plurality of images related to a learning target for machine learning in accordance with a result of image matching between the plurality of images, apply an obscuring processing to a specific region other than the region of interest in each of the plurality of images, and generate learning data including the plurality of images to which the obscuring processing is applied.

11 Claims, 12 Drawing Sheets

(56) References Cited

OTHER PUBLICATIONS

P. F. Alcantarilla et al.,"KAZE Features", Computer Vision—ECCV 2012, 14 Pages, 2012.
D. G. Lowe,"Distinctive Image Features from Scale-Invariant Keypoints", International Journal of Computer Vision, vol. 60 Issue 2, pp. 91-110, Nov. 2004.
H. Bay et al. ,"Speeded-Up Robust Features (SURF)", Computer Vision and Image Understanding, vol. 110 Issue 3, 14 Pages, Jun. 2008.

* cited by examiner

ACCURACY = 82.7652% (437/528) (CLASSIFICATION)

| COL_0 / LOW_0 | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0  | 20 | 8  | 2  | 0  | 0  | 0  | 1  | 3  | 0  | 0  | 0  | 1  | 0  | 0  |
| 1  | 9  | 23 | 2  | 0  | 0  | 0  | 2  | 3  | 0  | 0  | 0  | 1  | 0  | 0  |
| 2  | 4  | 5  | 34 | 0  | 0  | 0  | 2  | 2  | 0  | 0  | 0  | 6  | 0  | 0  |
| 3  | 0  | 0  | 0  | 28 | 7  | 0  | 2  | 0  | 3  | 0  | 0  | 0  | 0  | 0  |
| 4  | 0  | 0  | 0  | 0  | 7  | 0  | 0  | 0  | 0  | 0  | 0  | 0  | 0  | 0  |
| 5  | 0  | 0  | 0  | 0  | 0  | 23 | 0  | 0  | 0  | 1  | 1  | 1  | 1  | 1  |
| 6  | 0  | 0  | 0  | 0  | 0  | 0  | 28 | 0  | 0  | 2  | 0  | 0  | 0  | 0  |
| 7  | 1  | 6  | 1  | 3  | 0  | 0  | 1  | 17 | 0  | 0  | 1  | 3  | 0  | 0  |
| 8  | 0  | 1  | 0  | 0  | 0  | 0  | 1  | 0  | 29 | 0  | 0  | 0  | 0  | 0  |
| 9  | 0  | 0  | 0  | 0  | 0  | 1  | 1  | 0  | 0  | 13 | 0  | 0  | 0  | 0  |
| 10 | 1  | 0  | 0  | 0  | 0  | 0  | 0  | 1  | 0  | 0  | 27 | 5  | 0  | 0  |
| 11 | 1  | 0  | 4  | 0  | 0  | 0  | 1  | 1  | 0  | 0  | 0  | 36 | 0  | 0  |
| 12 | 0  | 0  | 0  | 0  | 0  | 0  | 0  | 1  | 0  | 0  | 0  | 1  | 85 | 0  |
| 13 | 0  | 0  | 0  | 0  | 0  | 0  | 0  | 0  | 0  | 0  | 0  | 0  | 0  | 78 |

FIG. 11B

ACCURACY = 85.7955% (453/528) (CLASSIFICATION)

| COL_0 / LOW_0 | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0  | 26 | 8  | 0  | 0  | 0  | 0  | 1  | 0  | 0  | 0  | 0  | 0  | 0  | 0  |
| 1  | 7  | 33 | 0  | 0  | 0  | 0  | 0  | 1  | 0  | 0  | 0  | 0  | 0  | 0  |
| 2  | 2  | 3  | 21 | 1  | 0  | 0  | 0  | 2  | 0  | 0  | 0  | 7  | 0  | 0  |
| 3  | 2  | 0  | 0  | 28 | 7  | 0  | 2  | 2  | 3  | 0  | 0  | 0  | 0  | 0  |
| 4  | 0  | 0  | 0  | 0  | 7  | 0  | 0  | 0  | 0  | 0  | 0  | 0  | 0  | 0  |
| 5  | 0  | 0  | 0  | 0  | 0  | 23 | 0  | 0  | 0  | 1  | 1  | 1  | 1  | 1  |
| 6  | 0  | 0  | 0  | 0  | 0  | 0  | 28 | 0  | 0  | 2  | 0  | 0  | 0  | 0  |
| 7  | 3  | 0  | 1  | 3  | 0  | 0  | 2  | 19 | 0  | 0  | 1  | 0  | 0  | 0  |
| 8  | 0  | 1  | 0  | 0  | 0  | 0  | 1  | 1  | 29 | 0  | 0  | 3  | 0  | 0  |
| 9  | 0  | 0  | 0  | 0  | 0  | 0  | 0  | 0  | 0  | 13 | 0  | 0  | 0  | 0  |
| 10 | 0  | 0  | 0  | 0  | 0  | 1  | 1  | 1  | 0  | 0  | 27 | 6  | 0  | 0  |
| 11 | 0  | 0  | 4  | 0  | 0  | 0  | 1  | 0  | 0  | 0  | 0  | 36 | 0  | 0  |
| 12 | 0  | 0  | 0  | 0  | 0  | 0  | 1  | 0  | 0  | 0  | 0  | 1  | 85 | 0  |
| 13 | 0  | 0  | 0  | 0  | 0  | 0  | 0  | 0  | 0  | 0  | 0  | 0  | 0  | 78 |

FIG. 12

LEARNING DATA GENERATION APPARATUS AND LEARNING DATA GENERATION METHOD

CROSS-REFERENCE TO RELATED APPLICATION

This application is based upon and claims the benefit of priority of the prior Japanese Patent Application No. 2018-223405, filed on Nov. 29, 2018, the entire contents of which are incorporated herein by reference.

FIELD

The embodiment discussed herein is related to a technique of generating learning data.

BACKGROUND

In the field of artificial intelligence for automatically classifying images on each of which various objects are photographed, efforts have been recently made to enhance the correct ratio of classification. For example, a convolutional neural network (CNN) has been known as a model of artificial intelligence.

In classification processing using the CNN, a convolution operation is performed on an input image to extract features from the image, and the image is classified into any of classes based on the extracted features. In this case, by changing the number of layers in deep learning or the network structure, it is possible to improve the feature extraction accuracy and thereby enhance the correct ratio of the classification. Various features are known as features extracted from an image.

There have been also known an image retrieval method of retrieving an image similar to a query image, a feature point selection system of selecting feature points from a three-dimensional shape model, and an image processing apparatus of associating the three-dimensional coordinates of an observation target with the two-dimensional coordinates of a camera image.

For example, related arts are disclosed in Japanese Laid-open Patent Publication Nos. 2011-008507, 2010-218051, and 2014-038566; A. Krizhevsky et al., "Image Net Classification with Deep Convolutional Neural Networks", NIPS'12 Proceedings of the 25th International Conference on Neural Information Processing Systems, Volume 1, Pages 1097-1105, December 2012; E. Rublee et al., "ORB: an efficient alternative to SIFT or SURF", ICCV'11 Proceedings of the 2011 International Conference on Computer Vision, Pages 2564-2571, November 2011; P. F. Alcantarilla et al., "KAZE Features", Computer Vision-ECCV 2012, Pages 214-227, 2012; D. G. Lowe, "Distinctive Image Features from Scale-Invariant Keypoints", International Journal of Computer Vision, Volume 60 Issue 2, Pages 91-110, November 2004; and H. Bay et al., "Speeded-Up Robust Features (SURF)", Computer Vision and Image Understanding, Volume 110 Issue 3, Pages 346-359, June 2008.

SUMMARY

According to an aspect of the embodiments, a learning data generation apparatus includes a memory and a processor configured to perform determination of a region of interest in each of a plurality of images related to a learning target for machine learning in accordance with a result of image matching between the plurality of images, apply an obscuring process to a specific region other than the region of interest in each of the plurality of images, and generate learning data including the plurality of images to which the obscuring process is applied.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In order to enhance the correct ratio of classification of an image, it is effective to extract features leading to enhancement of the classification accuracy, from objects photographed in the image including a classification target object such as a person and non-classification target objects such as a background. In the case of image classification using the CNN, however, the accuracy of extracting features of a classification target object may decrease depending on the number of images given as learning data to the CNN. Note that this problem occurs not only in the image classification using the CNN but also in image processing using another model based on machine learning.

Hereinafter, an embodiment will be described in detail with reference to the accompanying drawings. In the case of classification using the CNN, if a huge number of images are given as learning data, the CNN makes learning to extract only features of a classification target object from the images. The huge number of mages may be, for example, several tens of thousands of images or more.

Nevertheless, if only a small number of images are given as learning data, learning to also extract features of a non-classification target object, which are unnecessary for the classification, may be highly possibly made because a single image has large influence on the learning result. The small number of images may be, for example, several tens to several hundreds of images.

To address this, a segmentation is performed to cut out a region where a classification target object is photographed from an Image, so that extraction of features of a non-classification target object may be reduced. In order to perform the segmentation, however, work for generating correct data for supervised learning is required.

Figure 1:
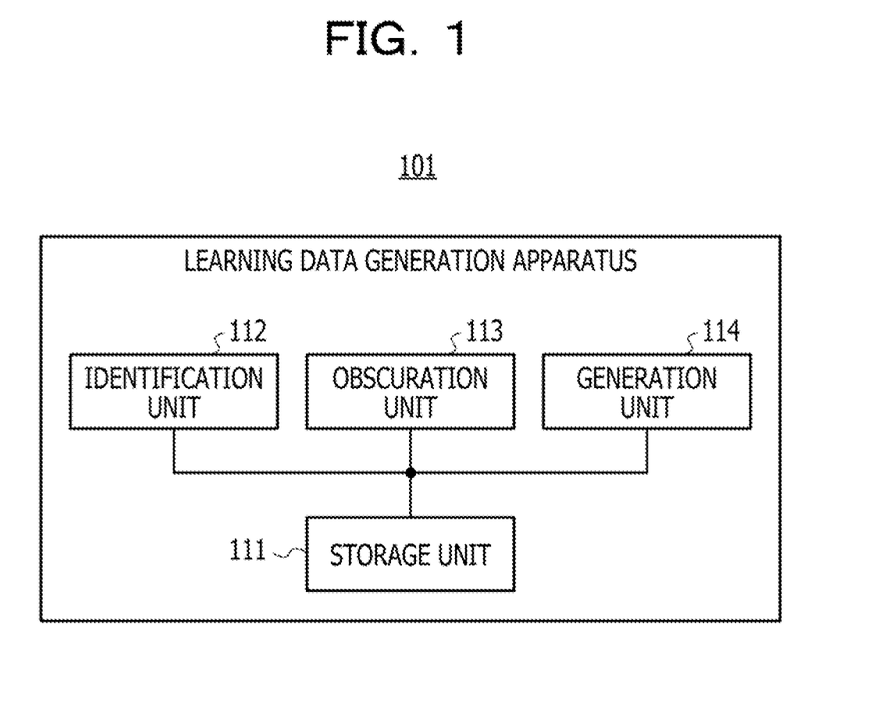
FIG. 1 is a functional configuration diagram of a learning data generation apparatus.

FIG. 1 is a functional configuration diagram of a learning data generation apparatus according to an embodiment. A learning data generation apparatus 101 in FIG. 1 includes a storage unit 111, an identification unit 112, an obscuration unit 113, and a generation unit 114. The storage unit 111 stores multiple images related to a learning target object in machine learning. The identification unit 112, the obscuration unit 113, and the generation unit 114 perform learning data generation processing by use of the multiple images stored in the storage unit 111.

Figure 2:
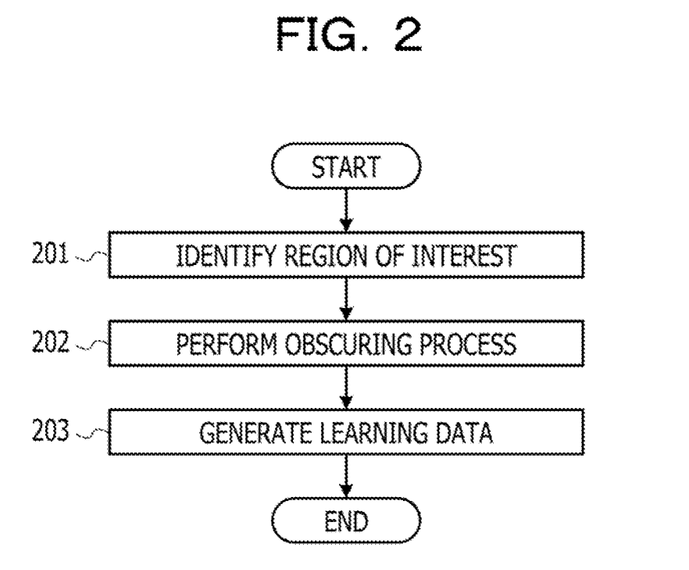
FIG. 2 is a flowchart of earning data generation processing.

FIG. 2 is a flowchart illustrating an example of the learning data generation processing performed by the learning data generation apparatus 101 in FIG. 1. First, the identification unit 112 identifies a region of interest in each of the images stored in the storage unit 111, based on a result of image matching between the concerned image and the rest of the images (step 201).

Next, the obscuration unit 113 applies an obscuring process to a region other than the region of interest in each of the multiple images stored in the storage unit 111 (step 202). Thereafter, the generation unit 114 generates learning data including the multiple images to which the obscuring process is applied (step 203).

The learning data generation apparatus 101 as described above enables enhancement of the accuracy of identifying an object photographed in an image in image processing using machine learning.

Figure 3:
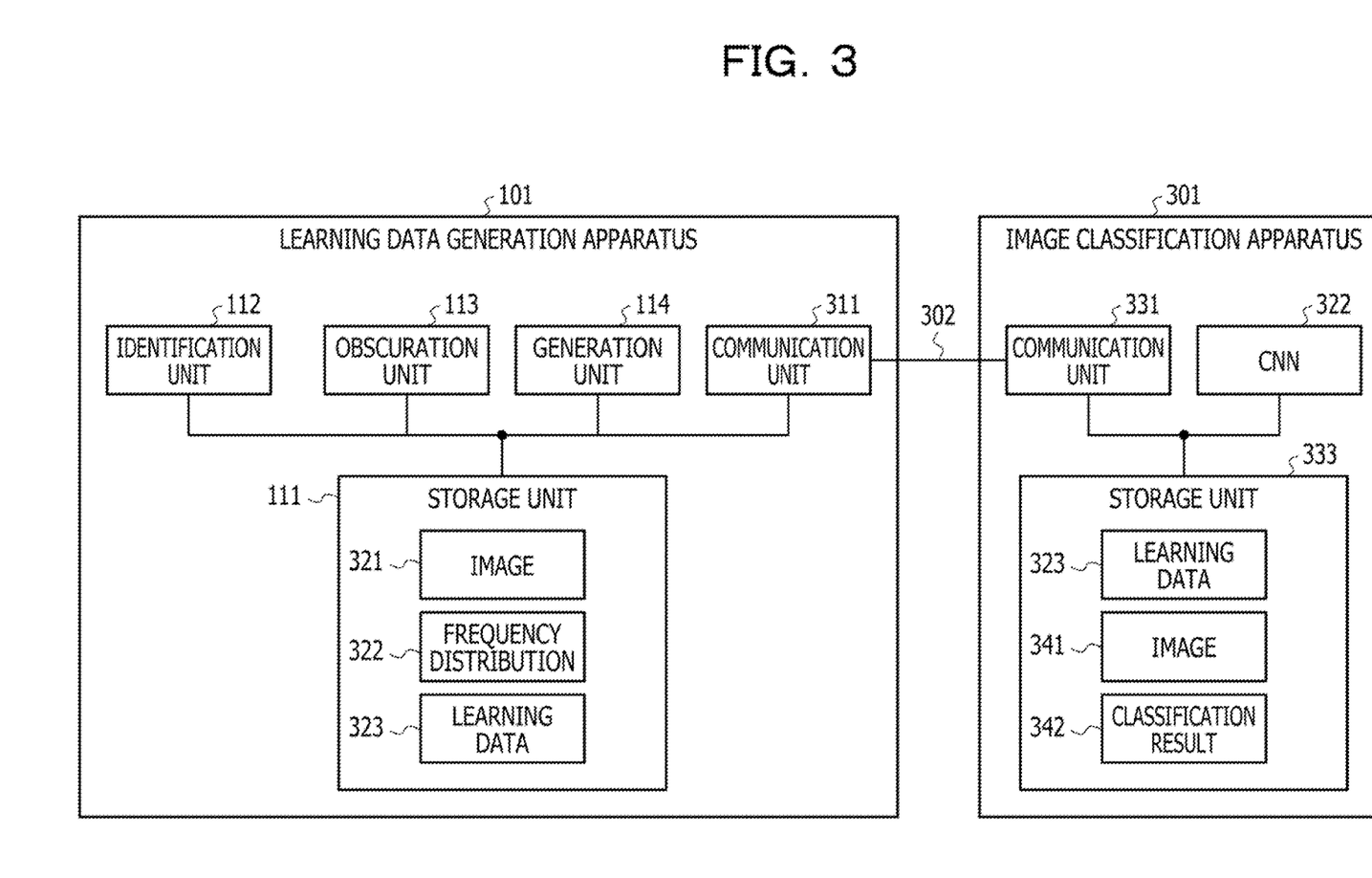
FIG. 3 is a functional configuration diagram of an image classification system.

FIG. 3 illustrates a functional configuration example of an image classification system including the learning data generation apparatus 101 in FIG. 1. The image classification system in FIG. 3 includes the learning data generation apparatus 101 and an image classification apparatus 301.

The learning data generation apparatus 101 includes the storage unit 111, the identification unit 112, the obscuration unit 113, the generation unit 114, and a communication unit 311. The storage unit 111 stores multiple images 321 on each of which a classification target object of the same type as a learning target object in machine learning is photographed. For example, if the learning target object is a person, each image 321 is an image on which a person is photographed. If the learning target object is an automobile, each image 321 is an image on which an automobile is photographed. If the learning target object is a ship, each image 321 is an image on which a ship is photographed.

The type of a classification target object photographed in an image 321 may be determined visually by a user, or be determined by the learning data generation apparatus 101 based on a tag added to the image 321.

Figure 4:
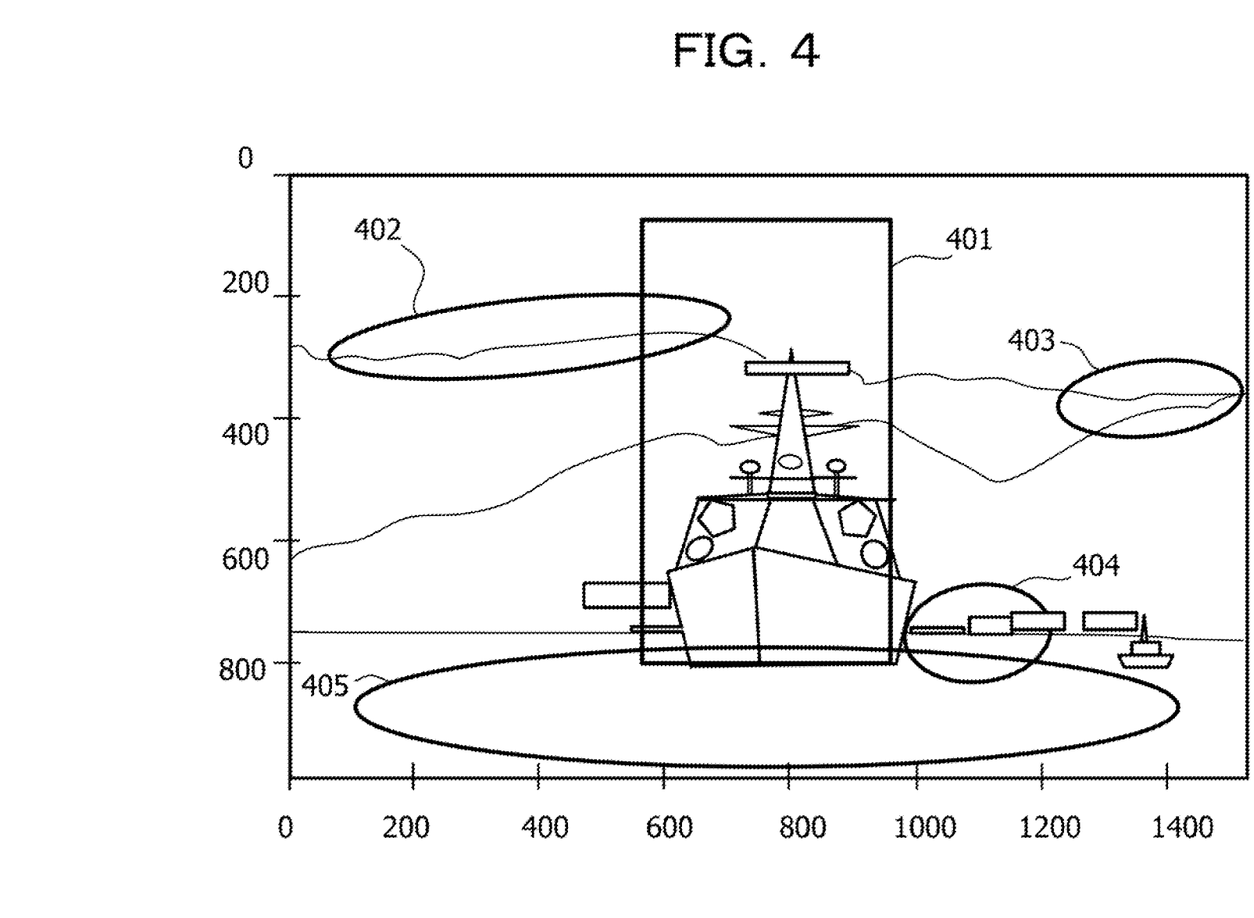
FIG. 4 is a diagram illustrating an image.

FIG. 4 illustrates an example of an image 321. In this example, the learning target object is a ship, and a background as non-classification target objects are photographed together with the ship as the classification target object in the image in FIG. 4. For example, mountains are included in regions 402 and 403, buildings are included in a region 404, and the sea is included in a region 405.

Even if a rectangular region 401 on which the ship is photographed is cut out by using a boundary box in order to reduce the influence of the background, part of the background is included in the rectangular region 401. For this reason, in the learning by the CNN, the CNN also unavoidably learns information on non-classification target objects photographed around a classification target object when learning information on the classification target object.

To address this, the identification unit 112 performs image matching between each of the images 321 and the rest of the images 321 to obtain a frequency distribution 322 of feature points in the image 321, and stores the obtained frequency distribution 322 into the storage unit 111. After that, the identification unit 112 identifies a region of interest in each image 321 based on the frequency distribution 322.

Use of images 321 on each of which an object of the same type as the learning target object is photographed makes it possible to perform image matching between the images, and associate the feature points in an image with the feature points in the other images. For example, the identification unit 112 may perform the image matching by using features as listed below:

(F1) Oriented FAST and Rotated BRIEF (ORB) described in E. Rublee et al.;
(F2) KAZE features described in P. F. Alcantarilla et al.;
(F3) Accelerated-KAZE features;
(F4) Scale-invariant feature transform (SIFT) features described in D. G. Lowe; and
(F5) Speeded-up robust features (SURF) described in H. Bay et al.

The frequency distribution 322 includes a frequency value for each of feature points in a processing target image 321, and the frequency value for each concerned feature point indicates the number of feature points in all the other images 321 associated with the concerned feature point. The identification unit 112 generates the frequency distribution 322 by mapping the feature points in all the other images 321 to the processing target image 321.

Figure 5A:
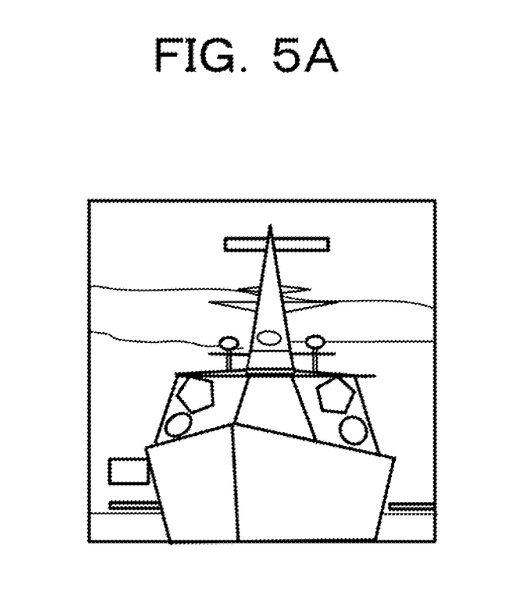
FIGS. 5A and 5B are diagrams illustrating an image in a rectangular region and a frequency distribution therein.
Figure 5B:
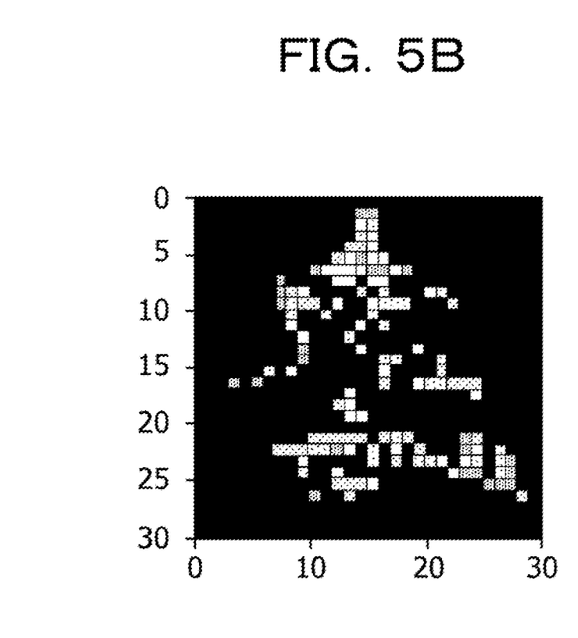

FIGS. 5A and 5B illustrate examples of an image in a rectangular region on which the ship is photographed and the frequency distribution 322 therein. FIG. 5A illustrates the example of the image in the rectangular region and FIG. 5B illustrates the example of the frequency distribution 322 in the rectangular region in FIG. 5A. In the frequency distribution 322 in FIG. 5B, a color of a pixel corresponding to each of feature points extracted from the rectangular region in FIG. 5A is changed according to the frequency value for the concerned feature point to represent the distribution of the frequency values in the rectangular region.

For example, the identification unit 112 extracts, as a region of interest, a group of feature points each having a larger frequency value than a predetermined threshold in the frequency distribution 322, Thus, only the feature points representing the shape of the classification target object in the rectangular region may be extracted as a region of interest.

The obscuration unit 113 obtains the frequency value of each of the feature points included in the region other than the region of interest by referring to the frequency distribution 322 of each image 321, and determines a specific region including each of the feature points according to the frequency value of the feature point. The obscuration unit 113 applies an obscuring process to the determined specific region, and thereby obscures the image in the region other than the region of interest. For example, the obscuration unit 113 may applies any of obscuring processes as listed below:

(P1) Blur process;
(P2) Contrast change process,
(P3) Grayscale process;
(P4) Sepia-tone process;
(P5) Dilating process;
(P6) Eroding process; and
(P7) Jitter process.

The blur process is a process of applying a filtering process with a blur filter to the pixels in the specific region to replace the pixel values of these pixels with a statistical value. For example, a filter such as Blur filter, Gaussian_blur, or median_blur may be used as the blur filter, and a value such as an average value, a median value, a maximum value, or a minimum value of the pixel values within the specific region may be used as the statistical value.

The contrast change process is a process of increasing or decreasing the brightness, hue, luminance, saturation, or the like of the pixels within the specific region to reduce the information amount. The grayscale process and the sepiatone process are processes of narrowing a dispersion of RGB values of the pixels within the specific region to reduce the information amount.

The dilating process is a process of replacing the brightness value of a feature point with the maximum brightness value within the specific region including the feature point, whereas the eroding process is a process of replacing the brightness value of a feature point with the minimum brightness value within the specific region including the feature point. By the dilating process or the eroding process, it is possible to reduce the information amount of the feature point according to the conditions around the feature point. The jitter process is a process of randomizing the pixel values of the pixels within the specific region to convert them into noise, so that features are less likely to be extracted.

The obscuration unit 113 may also apply a different type of obscuring process depending on a non-classification target object photographed in the image 321. For example, if the background includes a sea surface, the features representing light reflection by the sea surface are made less likely to be extracted by application of a process of reducing the contrast. If the background includes waves, the features representing the waves are made less likely to be extracted by application of the dilating process or the eroding process. If the background includes an object such as a mountain or a building, the contour line of the object is converted into noise by application of the jitter process, and the features representing the object are less likely to be extracted.

The type of obscuring process applied to each image 321 may be designated by a user. Alternatively, the obscuration unit 113 may identify a non-classification target object by using a predetermined algorithm and determine the type of obscuring process depending on the identified non-classification target object.

Figure 6:
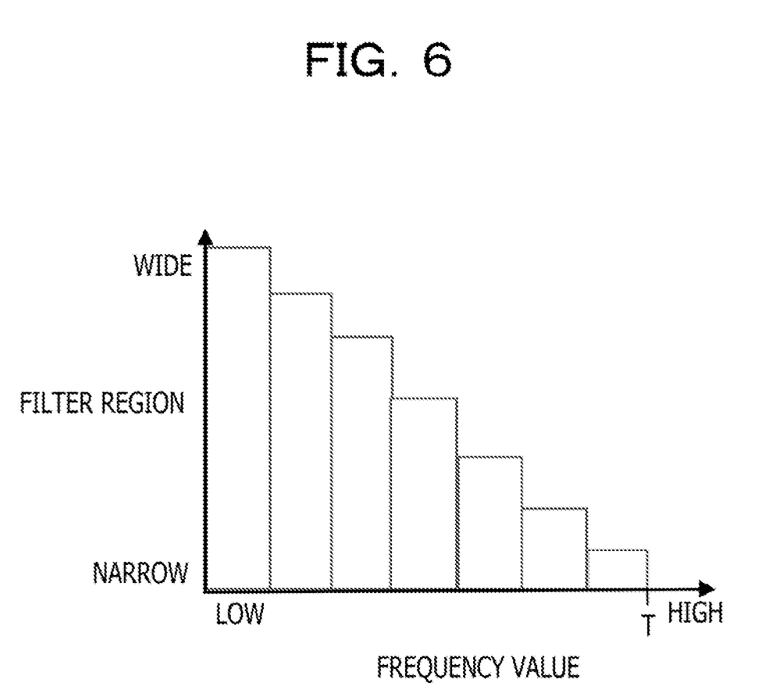
FIG. 6 is a diagram illustrating a relationship between a frequency value and a filter region.

FIG. 6 illustrates an example of a relationship between a frequency value for each feature point and a filter region in the case where the blur process is used as the obscuring process. In FIG. 6, the horizontal axis indicates the frequency value for a feature point and the vertical axis indicates the area of a filter region which is a specific region including the feature point. In this example, the area of the filter region for a feature point having a frequency value equal to or smaller than a threshold T decreases stepwise with an increase in the frequency value. Note that, since a feature point having a larger frequency value than the threshold T is extracted as a region of interest, the filter region is not set for the feature point.

When the filter region is narrowed with an increase in the frequency value, an image region to be obscured may be more limited for a feature point that matches with those in the other images 321 at a higher frequency. This makes it possible to increase the obscuration degree as the possibility that the feature point represents the shape of the classification target object becomes lower, and decrease the obscuration degree as the possibility that the feature point represents the shape of the classification target object becomes higher.

Figure 7:
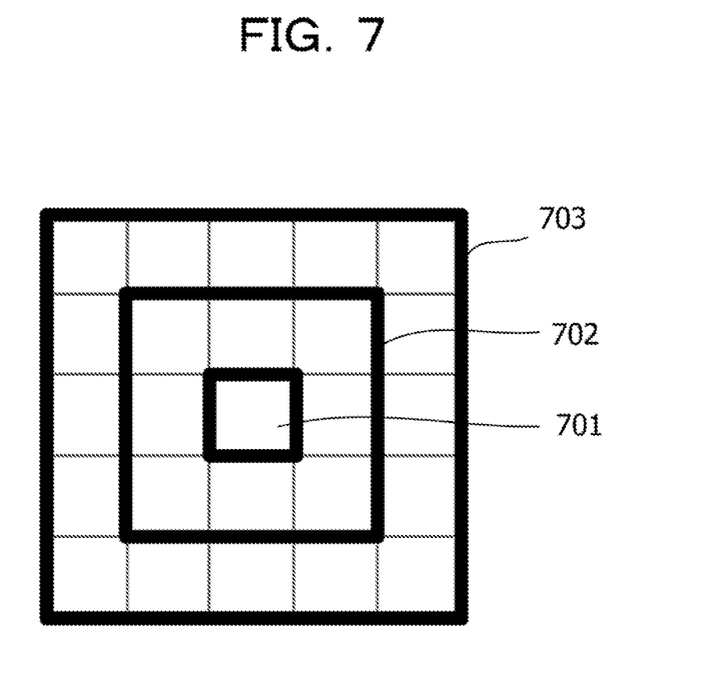
FIG. 7 is a diagram illustrating filter regions.

FIG. 7 illustrates an example of filter regions in two sizes set for a feature point. When the frequency value for a feature point 701 is equal to or smaller than a predetermined value, a 5×5 filter region 703 around the feature point 701 is set. Meanwhile, when the frequency value for the feature point 701 is larger than the predetermined value, a 3×3 filter region 702 around the feature point 701 is set.

Figure 8:
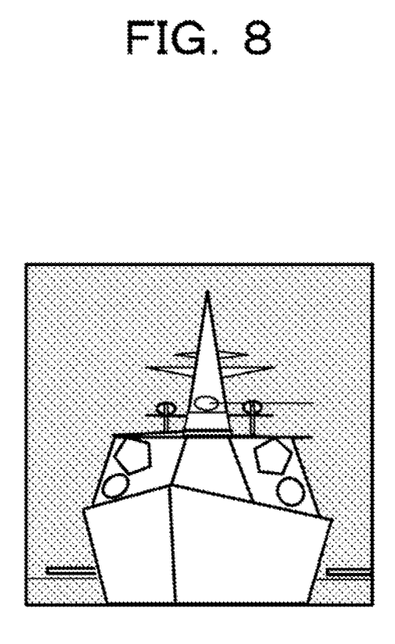
FIG. 8 is a diagram illustrating an obscured image.

FIG. 8 illustrates an example of an image obscured by applying the blur process to the region other than the region of interest within the rectangular region in FIG. 5A. In this case, the filter region is set for each of feature points other than the feature points representing the shape of the ship as the classification target object, and the filter process using a blur filter is applied to the filter region. As a result, the background of the ship is obscured.

When the region of interest only including the feature points representing the shape of the classification target object is identified and the image in the region other than the region of interest is obscured as described above, the influence of the features of the non-classification target object may be reduced. Thus, in the learning processing using obscured images 321, the features of the non-classification target object are less likely to be extracted because the non-classification target object is made inactive.

The generation unit 114 generates learning data 323 including the multiple images 321 to which the obscuring process is applied and stores the learning data 323 into the storage unit 111, and the communication unit 311 transmits the learning data 323 to the image classification apparatus 301 via a communication network 302.

The image classification apparatus 301 includes a communication unit 331, a CNN 332, and a storage unit 333. The communication unit 331 receives the learning data 323 from the learning data generation apparatus 101, and stores the received learning data 323 into the storage unit 333.

The CNN 332 is a classifier for classifying images, and classifies an input image into any of multiple classes according to features of a classification target object photographed in the image. First, the CNN 332 determines a parameter for each layer in a neural network by executing the learning processing using the learning data 323.

Next, the CNN 332 executes classification processing using a classification target image 341 as input data and thereby classifies the image 341 into any of the classes. The CNN 332 generates a classification result 342 indicating a class to which the image 341 is classified and stores the classification result 342 into the storage unit 333.

According to the image classification system in FIG. 3, even when the learning data 323 includes only a small number of images 321, the CNN 332 may efficiently learn the features of the classification target object photographed in these images 321. As a result, it is possible to enhance the accuracy of determining the classification target object photographed in each image 341, and thereby enhance the correct ratio of the classification.

Figure 9:
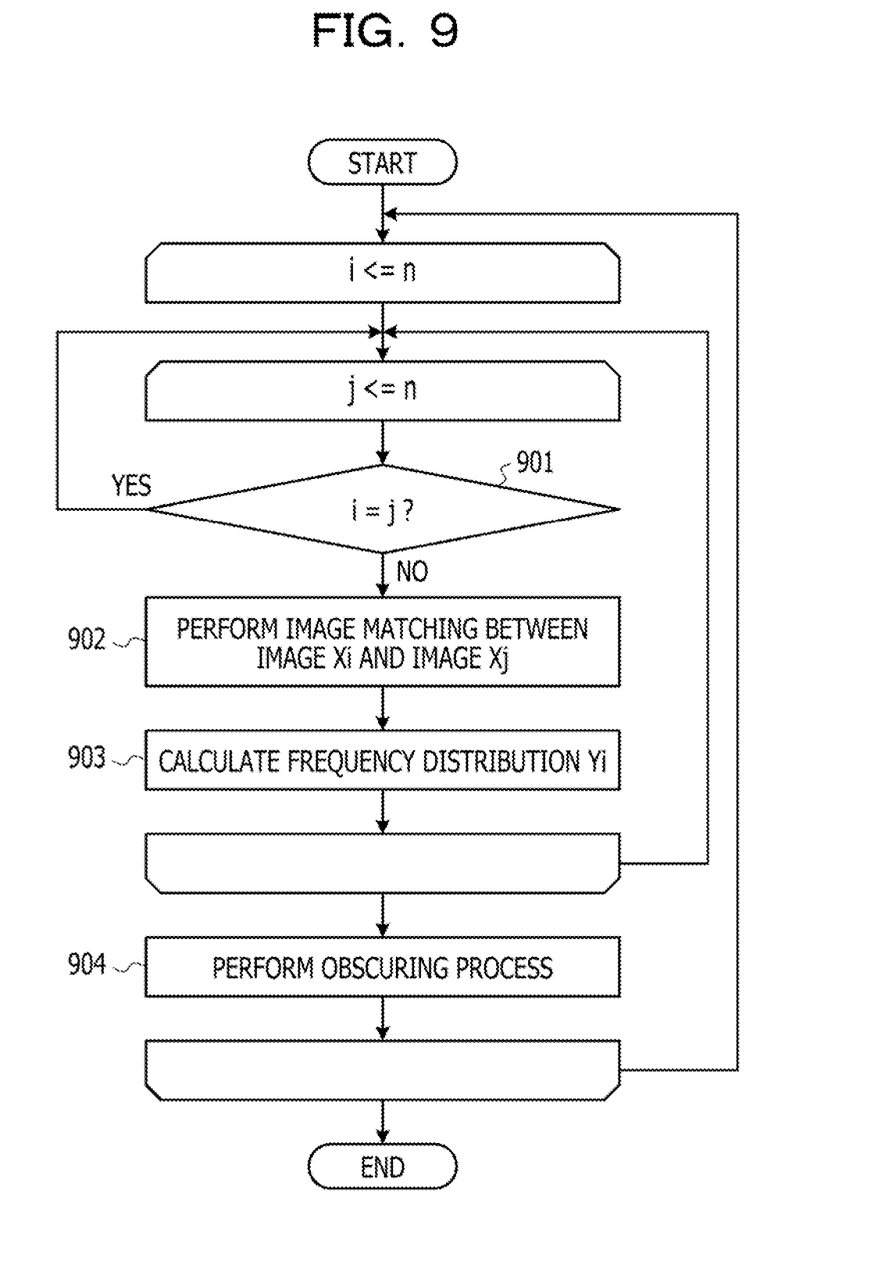
FIG. 9 is a flowchart illustrating a specific example of the learning data generation processing.

FIG. 9 is a flowchart illustrating a specific example of the learning data generation processing performed by the learning data generation apparatus 101 in FIG. 3. In this example, the storage unit 111 stores images X1 to Xn (n is an integer of 2 or more) as multiple images 321.

First, the identification unit 112 sets 1 as a control variable i representing a process target image Xi (i=1 to n), sets 1 as a control variable j representing a comparison target image Xj (j=1 to n), and compares i and j (step 901). If i=j (YES at step 901), the identification unit 112 increments j by 1 and iterates the processing at step 901.

On the other hand, if i≠j (NO at step 901), the identification unit 112 performs image matching between the image Xi and the image Xj (step 902), and calculates a frequency distribution Yi in the image Xi (step 903). The identification unit 112 increments j by 1 and iterates the processing at step 901.

When j reaches n, the identification unit 112 identifies a region of interest in the image Xi based on the frequency distribution Yi. Next, the obscuration unit 113 sets the specific region for each feature point included in the region other than the region of interest in the image Xi, and applies the obscuring process to the specific region thus set (step 904), The learning data generation apparatus 101 increments i by 1, sets j to 1, and iterates the processing at step 901.

When i reaches n, the generation unit 114 generates learning data 323 including the images X1 to Xn to which the obscuring process is applied.

Figure 10:
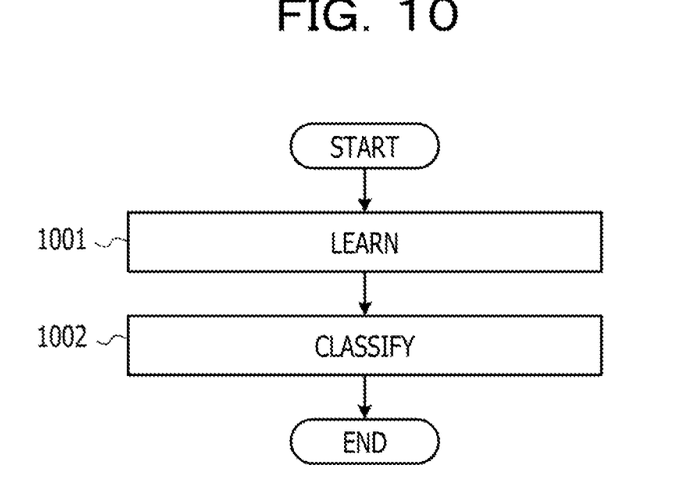
FIG. 10 is a flowchart of image classification processing.

FIG. 10 is a flowchart illustrating an example of the image classification processing. First, the CNN 332 performs the learning processing using the learning data 323 (step 1001). Next, the CNN 332 performs classification processing to classify each image 341 into any of the classes, and generates the classification result 342 indicating the class to which the image 341 is classified (step 1002).

Figure 11A:
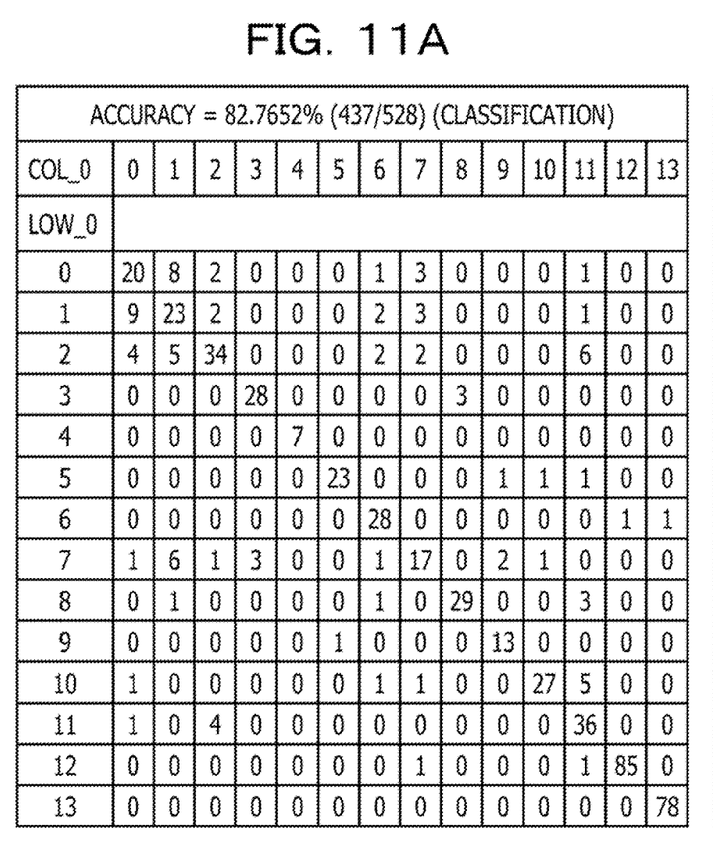
FIGS. 11A and 11B are diagrams illustrating classification results.
Figure 11B:
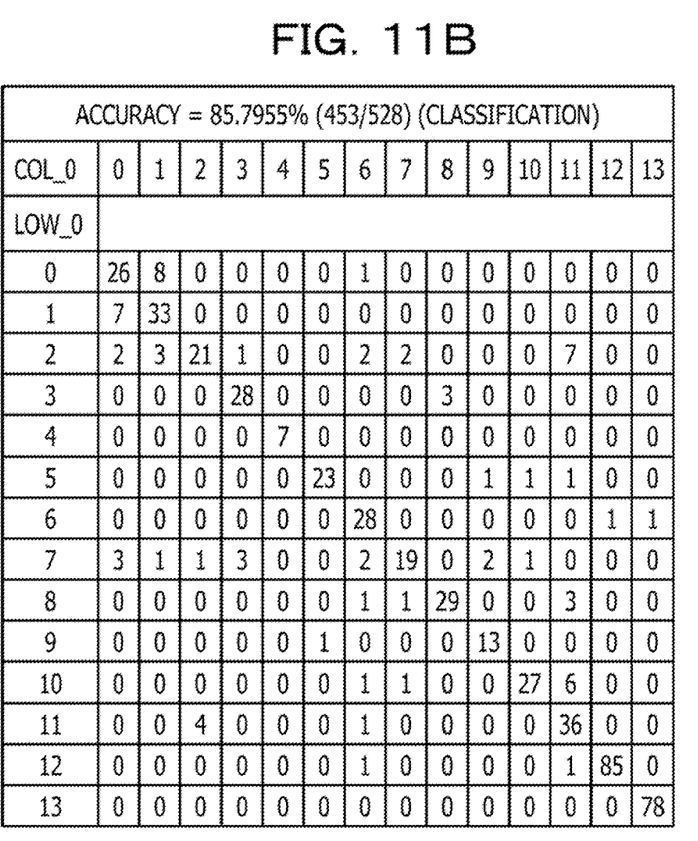

FIGS. 11A and 11B illustrate examples of classification results for the images X1 to Xn. In this example, n is 528 and each of 528 images is classified into any of classes 0 to 13.

FIG. 11A illustrates the example of the classification result in the case where the obscuring process is not applied to the images X1 to Xn. In the table in FIG. 11A, 14 columns represent the classes to which the images are classified by the CNN 332, and 14 rows represent the correct classes for the images. In other words, the number at the k-th row and m-th column (k=0 to 13 and m=0 to 13) indicates the number of images classified to the class m among the images whose correct class is a class k.

For example, there are 35 images whose correct class is the class 0, 20 images among the 35 images are classified into the class 0, and the other 15 images are classified into the other classes. As a result, the correct ratio of the images whose correct class is the class 0 is 20/35. There are 40 images whose correct class is the class 1, 23 images among the 40 images are classified into the class 1, and the other 17 images are classified into the other classes. As a result, the correct ratio of the images whose correct class is the class 1 is 23/40. The total correct ratio of all the 528 images is 437/528=82.7652%.

FIG. 11B illustrates the example of the classification result in the case where the blur process is applied to the 75 images whose correct classes are the classes 0 and 1. In this case, the correct ratio of the images whose correct class is the class 0 is 26/35, and the correct ratio of the images whose correct class is the class 1 is 33/40. The total correct ratio of all the 528 images is 453/528=85.7955%. Thus, it is understood that applying the blur process to some of the images results in enhancement of the correct ratio. The correct ratio is further enhanced when the blur process is applied to all the images.

The configuration of the learning data generation apparatus 101 illustrated in FIG. 1 is merely an example, and part of the constituent elements of the learning data generation apparatus 101 may be omitted or modified in accordance with usage or conditions of the learning data generation apparatus 101.

The configuration of the image classification system in FIG. 3 is merely an example, and part of the constituent elements of the image classification system may be omitted or modified in accordance with usage or conditions of the learning data generation apparatus 101. For example, if the CNN 332 is provided in the learning data generation apparatus 101, the communication unit 311 and the image classification apparatus 301 may be omitted.

Instead of the CNN 332, another neural network such as a feedforward neural network or a recurrent neural network may be used, or another model based on machine learning may be used. For example, a model such as a decision tree model, an association rule model, a genetic programming model, or a clustering model may be used instead of the CNN 332.

The flowcharts in FIGS. 2, 9, and 10 are merely examples, and part of the processing may be omitted or modified in accordance with the configuration or conditions of the learning data generation apparatus 101.

The images 321 illustrated in FIGS. 4 and 5A are merely examples, and the image 321 is changed depending on a learning target object. The frequency distribution 322 illustrated in FIG. 5B is merely an example, and the frequency distribution 322 is changed depending on the images 321.

The filter regions illustrated in FIGS. 6 and 7 are merely examples, and a filter region in a different size with a different shape may be used. The image illustrated in FIG. 8 is merely an example, and the obscured image is changed depending on a type of obscuring process. The classification results illustrated in FIGS. 11A and 11B are merely examples, and the classification result is changed depending on a classification target image and a type of obscuring process.

Figure 12:
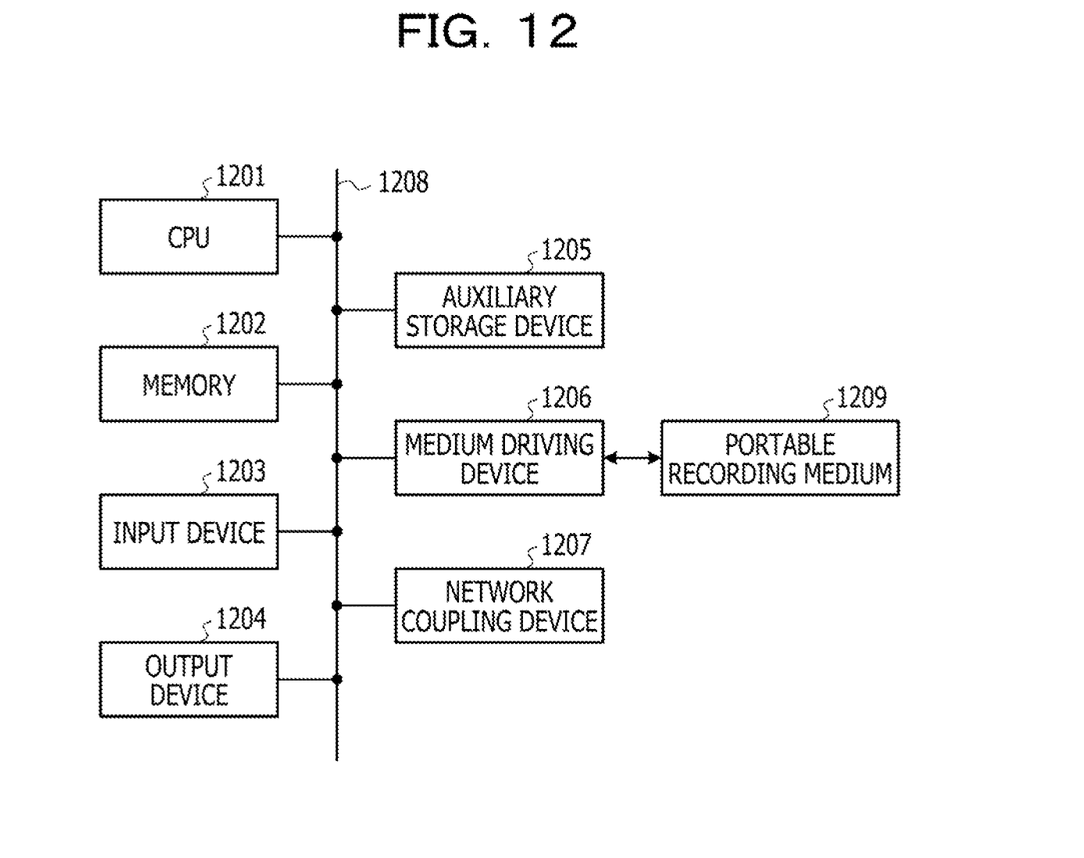
FIG. 12 is a diagram Illustrating a configuration of an information processing apparatus.

FIG. 12 illustrates a configuration example of an information processing apparatus (computer) for use as the learning data generation apparatus 101 in FIGS. 1 and 3 and the image classification apparatus 301 in FIG. 3. The information processing apparatus in FIG. 12 includes a central processing unit (CPU) 1201, a memory 1202, an input device 1203, an output device 1204, an auxiliary storage device 1205, a medium driving device 1206, and a network coupling device 1207. These constituent elements are coupled to each other via a bus 1208.

The memory 1202 is, for example, a semiconductor memory such as a read-only memory (ROM), a random-access memory (RAM), or a flash memory, and stores a program and data to be used for processing. The memory 1202 may be used as the storage unit 111 in FIGS. 1 and 3 or the storage unit 333 in FIG. 3.

The CPU 1201 (processor) operates as the identification unit 112, the obscuration unit 113, and the generation unit 114 in FIGS. 1 and 3, for example, by executing the program using the memory 1202. The CPU 1201 also operates as the CNN 332 in FIG. 3 by executing the program using the memory 1202.

The input device 1203 is, for example, a keyboard, a pointing device, or the like and is used for input of instructions or information from an operator or a user. The output device 1204 is, for example, a display device, a printer, a speaker, or the like, and is used for output of inquiries or instructions to the operator or the user and output of processing results.

The auxiliary storage device 1205 is, for example, a magnetic disk drive, an optical disk drive, a magneto-optical disk drive, a tape drive, or the like. The auxiliary storage device 1205 may be a hard disk drive or a flash memory. The information processing apparatus stores the program and data in the auxiliary storage device 1205 and may use the program and data by loading them into the memory 1202. The auxiliary storage device 1205 may be used as the storage unit 111 in FIGS. 1 and 3 and the storage unit 333 in FIG. 3.

The medium driving device 1206 drives a portable recording medium 1209 and accesses data recorded therein. The portable recording medium 1209 is a memory device, a flexible disk, an optical disk, a magneto optical disk, or the like. The portable recording medium 1209 may be a compact disc read-only memory (CD-ROM), a digital versatile disc (DVD), a Universal Serial Bus (USB) memory, or the like. The operator or the user may store the program and data in the portable recording medium 1209, and use the program and data by loading them into the memory 1202.

A computer-readable recording medium in which the program and data to be used for the processing are stored as described above is a physical (non-transitory) recording medium like the memory 1202, the auxiliary storage device 1205, or the portable recording medium 1209.

The network coupling device 1207 is a communication interface circuit which is coupled to the communication network 302 in FIG. 3, and performs data conversion for communication. The information processing apparatus may receive programs and data from external devices via the network coupling device 1207 and use the programs and data by loading them into the memory 1202, The network coupling device 1207 may be used as the communication unit 311 or the communication unit 331 in FIG. 3.

Note that the information processing apparatus does not have to include all the constituent elements in FIG. 12, and part of the constituent elements may be omitted depending on its usage or conditions. For example, in the case where the information processing apparatus does not have to interact with the operator or the user, the input device 1203 and the output device 1204 may be omitted. In the case where the portable recording medium 1209 or the communication network 302 is not used, the medium driving device 1206 or the network coupling device 1207 may be omitted.

Although the disclosed embodiment and its advantages have been described in detail, a person skilled in the art could make various changes, additions, and omissions without departing from the scope of the present disclosure clearly described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A learning data generation apparatus comprising:
   a memory; and
   a processor coupled to the memory and the processor configured to:
      perform determination of a region of interest in each of a plurality of images related to a learning target for machine learning in accordance with a result of image matching between the plurality of images,
      apply an obscuring processing to a specific region other than the region of interest in each of the plurality of images, and
      generate learning data including the plurality of images to which the obscuring processing is applied.

2. The learning data generation apparatus according to claim 1 wherein
   each of the plurality of images includes an object of a same type as the learning target.

3. The learning data generation apparatus according to claim 1, wherein
   the determination includes:
      obtaining, based on the result of the image matching, a frequency distribution of feature points in each of the plurality of images, and
      determining the region of interest based on the obtained frequency distribution.

4. The learning data generation apparatus according to claim 3, wherein
   the specific region is determined in accordance with a frequency value of each feature point in another region other than the region of interest in each of the plurality of images.

5. The learning data generation apparatus according to claim 1, wherein
   the obscuring processing includes at least one of a blur processing, a contrast change processing, a grayscale processing, a sepia-tone processing, a dilating processing, an eroding processing, or a jitter processing.

6. A compute implemented learning data generation method comprising:
   determining a region of interest in each of a plurality of images related to a learning target for machine learning in accordance with a result of image matching between the plurality of images;
   applying an obscuring processing to a specific region other than the region of interest in each of the plurality of images; and
   generating learning data including the plurality of images to which the obscuring processing is applied.

7. The learning data generation method according to claim wherein
   each of the plurality of ages includes an object of a same type as the learning target.

8. The learning data generation method according to claim 6 wherein
   the determining includes:
      obtaining, based on the result of the image matching, a frequency distribution of feature points in each of the plurality of images, and
      determining the region of interest based on the obtained frequency distribution.

9. The learning data generation method according to claim 8, wherein
   the specific region is determined in accordance with a frequency value of each feature points in another region other than the region of interest in each of the plurality of images.

10. The learning data generation method according to claim 6, wherein
    the obscuring processing includes at least one of a blur processing, a contrast change processing, a grayscale processing, a sepia-tone processing, a dilating processing, an eroding processing, or a jitter processing.

11. A non-transitory computer-readable medium storing a program executable by one or more computers, the program comprising:

one or more instructions for determining a region of interest in each of a plurality of images related to a learning target for machine learning in accordance with a result of image matching between the plurality of images;

one or more instructions for applying an obscuring processing to a specific region other than the region of interest in each of the plurality of images; and one or more instructions for generating learning data including the plurality of images to which the obscuring processing is applied.

\* \* \* \* \*